United States Patent
Qi et al.

(10) Patent No.: US 8,787,809 B2
(45) Date of Patent: Jul. 22, 2014

(54) PRESSURE MEMBERS COMPRISING CNT/PFA NANOCOMPOSITE COATINGS

(75) Inventors: Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 243 days.

(21) Appl. No.: 13/032,480

(22) Filed: Feb. 22, 2011

(65) Prior Publication Data

US 2012/0213563 A1    Aug. 23, 2012

(51) Int. Cl.
- G03G 15/20 (2006.01)
- B32B 27/00 (2006.01)
- B32B 9/04 (2006.01)
- B32B 27/32 (2006.01)
- B82Y 30/00 (2011.01)

(52) U.S. Cl.
USPC ........... 399/333; 428/421; 428/521; 428/447; 977/742; 977/902

(58) Field of Classification Search
USPC ........... 399/333; 428/421, 521, 447; 977/742, 977/902
See application file for complete search history.

(56) References Cited

U.S. PATENT DOCUMENTS

| | | | |
|---|---|---|---|
| 2003/0054280 A1* | 3/2003 | Ishihara et al. | 430/124 |
| 2006/0240218 A1* | 10/2006 | Parce | 428/98 |
| 2006/0292360 A1* | 12/2006 | Hays et al. | 428/323 |
| 2009/0257796 A1* | 10/2009 | Colvin et al. | 399/336 |
| 2010/0137499 A1* | 6/2010 | Moorlag et al. | 524/496 |
| 2011/0014466 A1* | 1/2011 | Hu et al. | 428/367 |
| 2011/0142508 A1* | 6/2011 | Qi et al. | 399/333 |
| 2011/0204297 A1* | 8/2011 | Park et al. | 252/503 |
| 2011/0250439 A1 | 10/2011 | Qi et al. | |
| 2011/0275502 A1* | 11/2011 | Eichhorn et al. | 492/53 |
| 2011/0300368 A1* | 12/2011 | Qi et al. | 428/296.4 |
| 2012/0163888 A1* | 6/2012 | Zhang et al. | 399/333 |

FOREIGN PATENT DOCUMENTS

JP     2008156646 A  *  7/2008

* cited by examiner

*Primary Examiner* — David Gray
*Assistant Examiner* — Tyler Hardman
(74) *Attorney, Agent, or Firm* — MH2 Technology Law Group LLP (57) ABSTRACT

Exemplary embodiments provide a pressure member used in electrophotographic printing devices, wherein the pressure member can include a coated outermost layer containing fluoropolymers and carbon nanotubes (CNTs) each surrounded by an elastomeric material.

19 Claims, 8 Drawing Sheets

FIG. 9

PRESSURE MEMBERS COMPRISING CNT/PFA NANOCOMPOSITE COATINGS

DETAILED DESCRIPTION

1. Field of Use

The present teachings relate generally to belt members used in an electrophotographic printing device and, more particularly, to pressure belts used in a fusing apparatus and an imaging forming apparatus.

2. Background

In a typical electrophotographic reproducing apparatus, a light image of an original to be copied is recorded in the form of an electrostatic latent image upon a photosensitive member. The latent image is subsequently rendered visible by application of electroscopic thermoplastic resin particles which are commonly referred to as toner. The visible toner image is then in a loose powdered form and is usually fixed or fused, using a fixing apparatus, upon a support, which may be the photosensitive member itself, or other support sheet such as plain paper.

Conventional fixing apparatus includes a fuser member and a pressure member, which may be configured to include a roll pair maintained in pressure contact or a belt member in pressure contact with a roll. In a fixing process, heat may be applied by heating one or both of the fuser member and the pressure member.

Current pressure belts often include a polyimide belt having a polyfluoroalkoxypolytetrafluoroethylene (PFA) surface coating as a release layer. The PFA release layer further provides wear resistance due to its low surface energy properties. It is desirable, however, to improve the releasing properties and mechanical robustness of conventional pressure belts to improve the lifetime of the pressure belts and lower the manufacturing costs.

SUMMARY

According to various embodiments, the present teachings include a fusing apparatus. The fusing apparatus can have a pressure member that includes a substrate and an outermost layer disposed over the substrate. The outermost layer can include a plurality of carbon nanotubes (CNTs) and an elastomeric material distributed within a fluoroplastic material for providing the outermost layer a tensile strength of at least about 3000 psi.

According to various embodiments, the present teachings also include a fusing apparatus. The fusing apparatus can include a fuser member and a pressure member configured to form a contact nip with the fuser member to fuse toner images on a print medium that passes through the contact nip. The pressure member can include a substrate and an outermost layer disposed over the substrate. The outermost layer can include a plurality of carbon nanotubes (CNTs) with each CNT surrounded by an elastomeric material and uniformly distributed in a fluoroplastic material to provide the outermost layer a toughness of at least about 3,000 in.-lbs./in.$^3$.

According to various embodiments, the present teachings further include an image forming apparatus. The image forming apparatus can include a photoreceptor for receiving an electrostatic latent image thereon; a development component for applying toner to the photoreceptor to develop the electrostatic latent image to form a developed image on the photoreceptor; a transfer component to transfer the developed image from the photoreceptor to a print medium; and a fusing apparatus. The fusing apparatus can include a fuser member and a pressure member configured for forming a contact nip between the fuser member and the pressure member for fusing toner images on the print medium passing through the contact nip. The pressure member can include an outermost layer having a plurality of carbon nanotubes (CNTs) with each surrounded by an elastomeric material and uniformly distributed within a fluoroplastic material to provide the outermost layer a tensile strength of at least about 3000 psi, an ultimate elongation of at least about 100%, and a toughness of at least about 3,000 in.-lbs./in.$^3$.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide a belt member used in electrophotographic printing devices. The belt member can include a coating layer disposed over a belt substrate. In an exemplary embodiment, the coating layer can include a plurality of carbon nanotubes (CNTs) dispersed in a polymer matrix formed of one or more fluoropolymers. The CNTs can be surrounded by one or more elastomeric materials. In one embodiment, the coating layer can be used as an outermost layer of the belt member and one or more other functional layers can be disposed between the outermost layer and the belt substrate. The outermost layer can provide desired mechanical, electrical, and/or thermal properties to the belt member.

As used herein and unless otherwise specified, the term "carbon nanotubes" or "CNTs" refers to elongated carbon materials having at least one minor dimension, for example, or diameter, of about 100 nanometers or less. Although the term "carbon nanotubes" or "CNTs" is referred to throughout the description herein for illustrative purposes, it is intended that the term also encompasses other elongated structures containing carbon materials of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

In various embodiments, CNTs can have an inside diameter and an outside diameter. For example, an average inside diameter can range from about 0.5 nm to about 20 nm, or from about 1 nm to about 15 nm, or from about 5 nm to about 10 nm. An average outside diameter can range from about 1 nm to about 80 nm, or from about 5 nm to about 70 nm, or from about 10 nm to about 60 nm. The carbon nanotubes can have an aspect ratio, e.g., ranging from about 1 to about 10,000, or from about 10 to about 5,000, or from about 100 to about 1,000.

CNTs can have various cross sectional shapes, such as, for example, a rectangular, polygonal, oval, or circular shape. Accordingly, the nanotubes can have, for example, cylindrical 3-dimensional structures. In embodiments, the dimensions and/or shapes of the CNTs are not limited.

CNTs can include, for example, single-wall carbon nanotubes (SWCNTs), double-wall carbon nanotubes (DWCNTs), multi-wall carbon nanotubes (MWCNTs), and their various functionalized and derivatized fibril forms such as carbon nanofibers. Additionally, the term CNTs can include modified CNTs from all possible CNTs and their combinations described there-above. The modification of CNTs can include a physical and/or a chemical modification. For example, CNTs can be modified/functionalized with controlled and/or increased mechanical, electrical or thermal properties through various physical and/or chemical modifications.

In some embodiments, CNTs can be obtained in low and/or high purity dried powder forms or can be purchased in various solutions. In other embodiments, CNTs can be available in the as-processed unpurified condition, where a purification process can be subsequently carried out.

Because of a large surface area to volume ratio, CNTs may have a tendency to clump together or agglomerate, and as such may not be amenable to processing into nanotube/polymer composites. One of practical approaches to prepare a composite containing CNT uniformly dispersed in a polymer can include use of a high shear mix. The composite can then be used to prepare coating compositions. Alternatively, stabilizer(s) can be used to facilitate a stable and/or uniform dispersion of CNTs to form a stabilized CNT-containing coating composition.

As used herein, the term "stabilizer" refers to any functional material admixed with CNTs and/or CNT-containing coating composition to facilitate a stable, non-agglomerating dispersion of CNTs.

The stabilizer can include for example, polymeric amines, polymeric acids, conjugated polymers, and natural gum materials. In some embodiments, the stabilizer can include, e.g., poly(allylamine), polyethylenimine, poly(diallyldimethylammonium chloride), poly(allylamine hydrochloride), and a combination thereof. In other embodiments, the stabilizer can include, e.g., poly(acrylic acid), poly(3,4-ethylenedioxythiophene), a complex of poly(3,4-ethylenedioxythiophene) with a polymeric acid, Gum Arobic, and/or chitosan.

As used herein, the term "dispersion" refers to any system that includes one substance being in another, e.g., one substance dissolving in another, or particles or other substance suspending or scattering in a fluid. Thus, the term "dispersion" can also be referred to herein as "solution", "suspension", "latex" or "emulsion". In various embodiments, the dispersion that involves one or more materials of a stabilizer, a fluoropolymer, nanotubes or fillers for the disclosed coating compositions, can have a controlled pH value. For example, to adjust the pH value, a variety of organic or inorganic acids or alkalines can be used including, but not limited to, acetic acid, sulfonic acid, hydrochloric acid, sodium hydroxide, or any other suitable acids or alkalines known to one of ordinary skill in the art. In various embodiments, the pH value can range from about 2 to about 11. In an additional example, the pH value can be from about 3 to about 10, or from about 5 to about 9.

In an exemplary embodiment, the stabilizer can include dual structure functionality. For example, the stabilizer can include a functional amino-group, which can be partially neutralized in a form of —$NH_2$ and can also be partially electrostatic or ionic in a form of —$NH_3^+$ in a CNT-containing dispersion, depending on the pH value of the dispersion.

In embodiments, the fluoropolymers can include, but are not limited to, fluoropolymers including, for example, fluorothermoplastics, fluoroelastomers, and/or fluororesins. Exemplary fluoroplastics can include PFA (polyfluoroalkoxypolytetrafluoroethylene), PTFE (polytetrafluoroethylene), and/or FEP (fluorinated ethylenepropylene copolymer). These fluoroplastics can be commercially available from various designations, such as TEFLON® PFA, TEFLON® PTFE, TEFLON® FEP available from E.I. DuPont de Nemours, Inc. (Wilmington, Del.), and/or THV fluoroplastic available from 3M™ Dyneon™.

Exemplary fluoroelastomers can include a polymer that has a monomeric repeating unit selected from tetrafluoroethylene (TFE), perfluoro(methyl vinyl ether), perfluoro(propyl vinyl ether), perfluoro(ethyl vinyl ether), vinylidene fluoride (VDF or VF2), hexafluoropropylene (HFP), and a mixture thereof. The fluoroelastomers can also include a curing site monomer, which can react with an effected curing agent to form the fluoroelastomers. For example, when the polymer matrix uses a vinylidene-fluoride-containing fluoroelastomer, the curing agent can include, a bisphenol compound, a diamino compound, an aminophenol compound, an amino-siloxane compound, an amino-silane, and/or a phenol-silane compound. An exemplary bisphenol cross-linker can be VITON® Curative No. 50 (VC-50) available from E. I. du Pont de Nemours, Inc. VC-50 can be soluble in a solvent suspension and can be readily available at the reactive curing sites for cross-linking with, for example, VITON®-GF (E. I. du Pont de Nemours, Inc.).

Commercially available fluoroelastomers can include, for example, VITON® A: copolymers of HFP and VDF (or VF2); VITON® B: terpolymers of TFE, VDF, and HFP; VITON® GF: tetrapolymers of TFE, VF2, and HFP; as well as VITON® E; VITON® E-60C; VITON® E430; VITON® 910; VITON® GH; and/or VITON® GF. The VITON®, designations are Trademarks of E.I. DuPont de Nemours, Inc. (Wilmington, Del.) and are also referred herein as "VITON."

Other commercially available fluoroelastomers can include those available from 3M Corporation (St. Paul, Minn.) including, for example, DYNEON™ fluoroelastomers, AFLAS® fluoroelastomers (e.g., a poly(propylene-tetrafluoroethylene)), and FLUOREL® fluoroelastomers (e.g. FLUOREL®II (e.g., LII900) a poly(propylene-tetrafluoroethylenevinylidenefluoride), FLUOREL® 2170, FLUOREL® 2174, FLUOREL® 2176, FLUOREL® 2177, and/or FLUOREL® LVS 76. Additional commercially available fluoroelastomer materials can include the "tecnoflons" identified as TN Latex, FOR®-60KIR, FOR®-LHF, FOR®-NM, FOR®-THF, FOR®-TFS, FOR®-TH, and FOR®-TN505, available from Solvay Solexis (West Deptford, N.J.).

Figure 1:
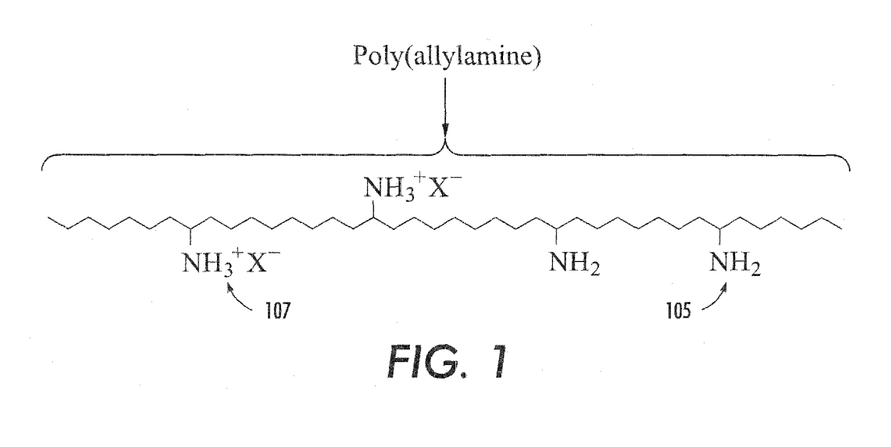
FIG. 1 depicts an exemplary stabilizer polymer in accordance with various embodiments of the present teachings.

FIG. 1 depicts a schematic showing an exemplary stabilizer polymer in accordance with the present teachings. Specifically, the exemplary stabilizer polymer can be a partially neutralized poly(allylamine) that contains the amino-dual structure functionality including neutralized amino groups ($—NH_2$) (see 105 in FIG. 1) and amines, e.g., ammonium salt ($—NH_3^+X^-$) (see 107 in FIG. 1) in an acidic condition.

Figure 2:
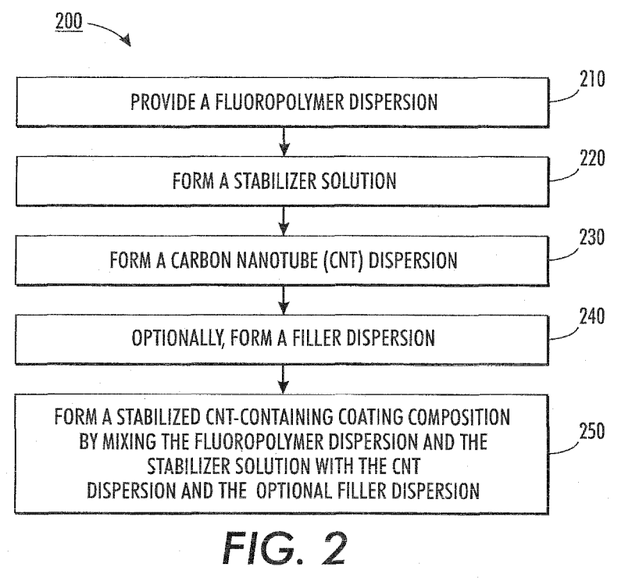
FIG. 2 depicts an exemplary method of forming a stabilized carbon nanotube (CNT)-containing coating composition in accordance with various embodiments of the present teachings.
Figure 3:
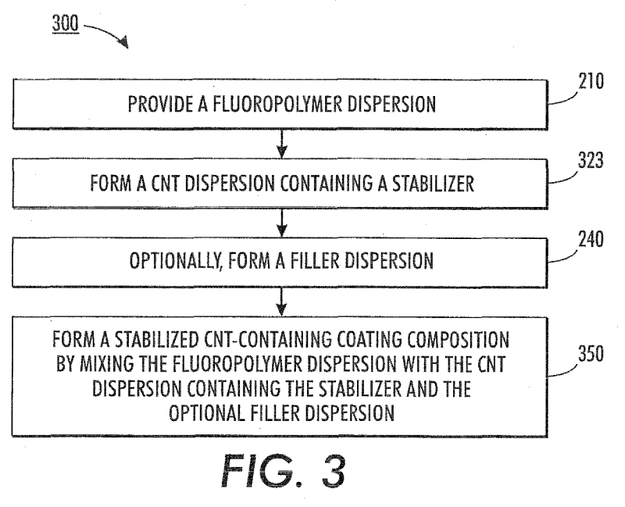
FIG. 3 depicts another exemplary method of forming a stabilized CNT-containing coating composition in accordance with various embodiments of the present teachings.

FIGS. 2-3 depict exemplary methods 200 and 300 for forming a stabilized CNT-containing coating composition in accordance with various embodiments of the present teachings.

At 210 of FIG. 2, fluoropolymer(s), e.g., TEFLON® PFA, can be provided in a form of, e.g., colloid dispersion, latex suspension, or a mixture thereof. For example, the fluoropolymer can include fluoropolymer particles having an average particle size ranging from about 10 nm to about 5000 nm. In an exemplary embodiment, the fluoropolymer can include a mixture of small particles with average particle size ranging from about 50 nm to about 500 nm and large particles with average particle size ranging from about 1 μm to about 50 μm.

At 220, a stabilizer solution can be formed. The stabilizer solution can include one or more stabilizers such as poly (allylamine) in a suitable solvent such as water. In an exemplary embodiment, hydrochloride acid (HCl) can be used to control the pH value of the stabilizer solution when poly (allylamine) is used.

At 230 of FIG. 2, CNTs can be dispersed in a dispersant, which can be a liquid including, but not limited to, water, alcohols, aliphatic hydrocarbons of, e.g., from about C5 to about C18, aromatic hydrocarbons of, e.g., from about C6 to about C18, dioxanes, ethers, ketones, amides, and mixtures thereof.

At 240 of FIG. 2, optionally, fillers such as inorganic particles can be used. For example, inorganic particles can be dispersed in a solvent, such as water, to form a filler dispersion. The filler dispersion can be prepared by sonication of inorganic particles in the presence of surface treatment agents such as silanes in the exemplary solvent of water.

Inorganic particles can include, but are not limited to, metal oxides, non-metal oxides, metals, or other suitable particles. Specifically, metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof. Non-metal oxides can include, for example, boron nitride, silicon carbides (SIC), and the like. The metals can include, for example, nickel, copper, silver, gold, zinc, iron, and the like. In various embodiments, other additives known to one of ordinary skill in the art can also be included in the stabilized CNT-containing coating composition.

At 250 of FIG. 2, a stabilized CNT-containing coating composition can be formed by mixing the fluoropolymer dispersion formed at 210 and the stabilizer solution formed at 220 with the CNT dispersion formed at 230 and the optional filler dispersion formed at 240.

Alternatively, the dispersant used for dispersing CNTs can also be used as a solvent for the stabilizer(s). For example, the stabilizer can first be dispersed in a dispersant as described above. CNTs can then be admixed with the dispersed stabilizer to form a CNT dispersion containing both the stabilizer and CNTs as depicted at 323 in FIG. 3. The CNT dispersion containing both the stabilizer and CNTs can further be mixed with the fluoropolymer dispersion formed at 210 of FIG. 2 as well as the optional filler dispersion formed at 240 of FIG. 2. A stabilized CNT-containing coating composition can then be formed as depicted at 350 in FIG. 3.

In various embodiments, ultrasonic energy sources, such as high-intensity ultrasonic processors, can be used to sonicate the dispersion as desired during any stage(s) of forming the stabilized CNT-containing coating composition to facilitate the dispersion of the stabilizer, CNTs, optional inorganic particles, and/or the fluoropolymer particles. In addition, pH value of the dispersion can be adjusted to maintain a desired value during any stage(s) of forming the stabilized CNT-containing coating composition.

In various embodiments, the CNT-containing coating composition formed as depicted in FIGS. 2-3 can be, for example, a stable and/or uniform CNT/PFA or CNT/PFA/SiC coating composition. Such coating composition can have a suitable shelf life and can be "coated" onto a surface as a coating layer or an outermost layer as disclosed herein. Various coating techniques can be used to apply the stabilized CNT-containing coating composition to an underlying surface. As used herein, the term "coating" or "coating technique" is not particularly limited in the present teachings, and dip coating, painting, brush coating, roller coating, pad application, spray coating, spin coating, casting, or flow coating can be employed. For example, the stabilized CNT-containing coating composition can be coated on a piece of polyimide substrate by spray-coating.

The coated coating composition can then be solidified by, for example, a drying process to form a coating layer on the underlying surface. In an exemplary embodiment, the coated coating composition can be baked at a temperature from about 200° C. to about 450° C., or form about 300° C. to a'bout 400° C., or from about 345° C. to about 365° C. In certain embodiments, the coated coating composition can be dried at about 350° C. for about 20 minutes followed by a drying at about 360° C. for about 10 minutes. Alternatively, the drying process can include a vacuum oven. Regardless of the manner in which the coating layer is formed, each dried coating layer can have a thickness. In embodiments, the coating and drying process can be repeated as desired to achieve a desired thickness, for example, ranging from about 5 microns to about 250 microns, or from about 20 microns to about 200 microns, from about 50 microns to about 150 microns depending on the specific application of the formed coating layer. As described below, the coating layer(s) formed in accordance with the present teachings can then be incorporated into exemplary belt members, for example, used as an outermost layer of the belt members.

Figure 4A:
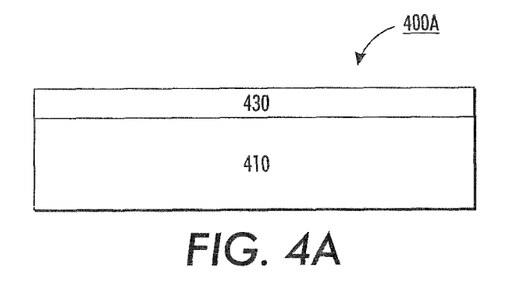
FIGS. 4A-4B depict exemplary belt members in accordance with various embodiments of the present teachings.
Figure 4B:
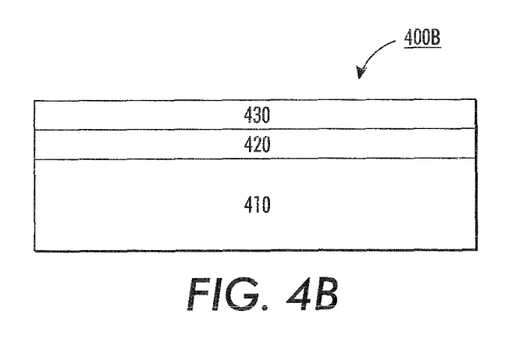

FIGS. 4A-4B depict exemplary belt members 400A-B in accordance with various embodiments of the present teachings. Alternatively, one of ordinary skill in the art would understand that the layered structures shown in FIGS. 4A-4B can be used for a roller member, wherein a roller substrate is used.

The exemplary belt members 400 A-B in FIGS. 4A-4B can include an outermost layer 430 formed over a belt substrate 410. The outermost layers 430 in FIGS. 4A-4B can be a coating layer formed from the stabilized CNT-containing coating composition, e.g., as shown in FIGS. 2-3.

The belt substrate 410 can alternatively include a film, sheet, or the The belt substrate 410 can have a thickness ranging from about 25 micrometers' to about 250 micrometers, or from about 60 micrometers to about 100 micrometers. The belt substrate 410 can include high temperature plastics that are capable of exhibiting high mechanical strength. Generally, such plastic substrate can have a flexural strength of from about 2,000,000 to about 3,000,000 psi, and a flexural modulus of from about 25,000 to about 55,000 psi. Plastics possessing the above characteristics and which are suitable for use as the substrate can include, for example, epoxy; polyphenylene sulfide such as that sold under the tradenames FORTRON® available from Hoechst Celanese, RYTON R-4® available from Phillips Petroleum, and SUPEC® available from General Electric; polyimides such as polyamide-imide sold under the tradename TORLON® 7130 available from Amoco; polyketones such as those sold under the tradename KADEL® E1230 available from Amoco, polyether ether ketone sold under the tradename PEEK 450GL30 from Victrex, polyaryletherketone, and the like; polyamides such as polyphthalamide sold under the tradename AMODEL® available from Amoco; polyethers such as polyethersulfone, polyetherimide, polyaryletherketone, and the like; polyparabanic acid; and the like; liquid crystalline resin (XYDAR®) available from Amoco; ULTEM® available from General Electric; ULTRAPEK® available from BASF; and the like, and mixtures thereof. The belt substrate 410 can also include mixtures of any of the above materials.

In a specific embodiment, the belt substrate 410 can be, for example, a polyimide substrate including, but not limited to, aromatic polyimide, polyamideimide, polyetherimide, siloxane polyetherimide block copolymer, and a mixture thereof.

In embodiments, the outermost layer 430 can be formed directly on a surface of the belt substrate 410 (see FIG. 4A), or can be formed on a functional layer 420 that is formed over the belt substrate 410 (see FIG. 4B).

The functional layer 420 can be, for example, a conformal layer, an adhesive layer, and/or a combination thereof. In exemplary embodiments, the belt member can be in a 2-layer configuration having a compliant layer 420, such as a silicone rubber layer having a thickness of, e.g., about 1 mm to about 5 mm, disposed between the coated outermost layer 430 and the belt substrate 410.

Figure 5A:
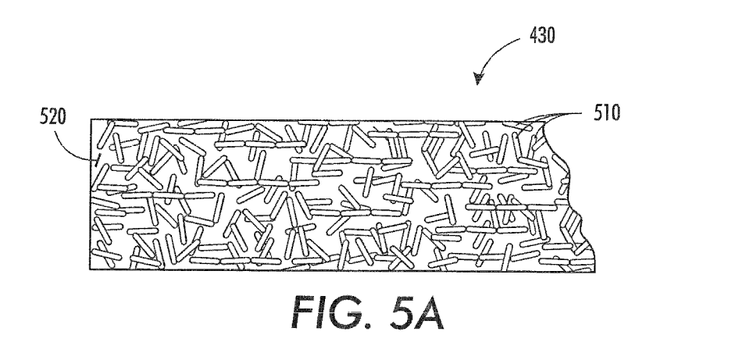
FIGS. 5A-5B depict exemplary outermost layers of the belt members in FIGS. 4A-4B in accordance with various embodiments of the present teachings.
Figure 5B:
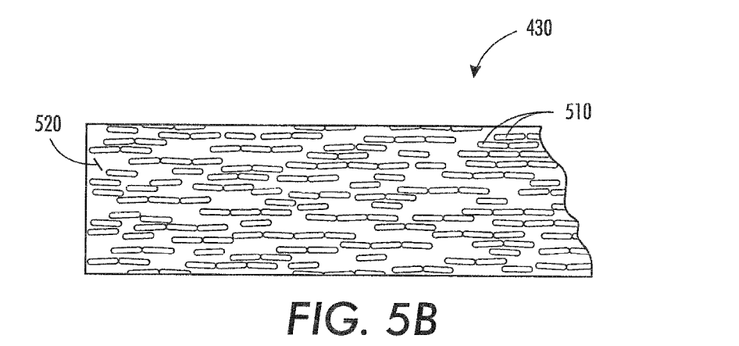

FIGS. 5A-5B are schematics showing exemplary outermost layers 430 of FIGS. 4A-4B in accordance with various embodiments of the present teachings. As shown, although the plurality of CNTs 510 is depicted having a consistent size in FIGS. 5A-5B, one of ordinary skill in the art would understand that the plurality of CNTs 510 can have different sizes, for example, different lengths, widths and/or diameters.

In FIG. 5A, the plurality of CNTs 510 can be dispersed uniformly throughout an exemplary fluoropolymer matrix 520. In one embodiment, CNTs can be bundled CNTs dispersed uniformly but with random tangles throughout the polymer matrix 520 of the coated layer 430.

In FIG. 5B, the plurality of CNTs 510 can be dispersed uniformly and spatially-controlled, for example, be aligned or oriented at certain directions, throughout the polymer matrix 520 of the coated layer 430 by, for example, use of a magnetic field.

Figure 6A:
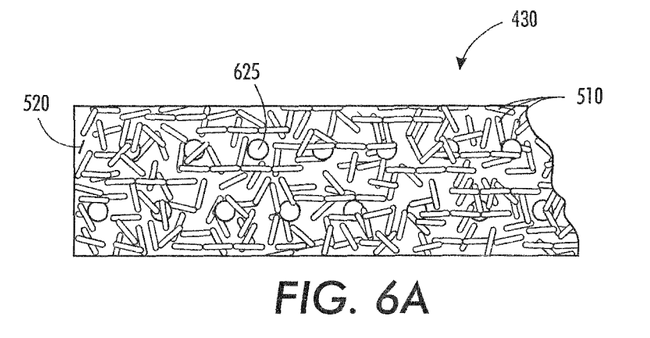
FIGS. 6A-6B depict additional exemplary outermost layers of the belt members in FIGS. 4A-4B in accordance with various embodiments of the present teachings.
Figure 6B:
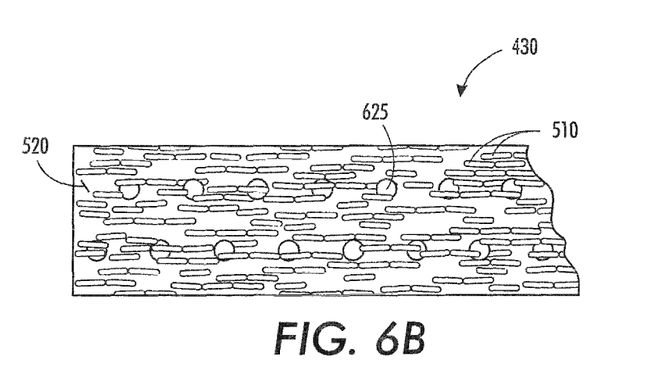

Various other exemplary outermost layers are schematically shown in FIGS. 6A-6B in accordance with various embodiments of the present teachings. As compared with the coated outermost layer shown in FIGS. 5A-5B, the coated outermost layer in FIGS. 6A-6B can further include a plurality of inorganic particles 625 along with the plurality of CNTs 510, which are stably and/or uniformly dispersed in the fluoropolymer matrix 520. The inorganic particles 625 can include, for example, aluminum oxide, chromium oxide, zirconium oxide, zinc oxide, tin oxide, iron oxide, magnesium oxide, manganese oxide, nickel oxide, copper oxide, antimony pentoxide, indium tin oxide, boron nitride, silicon carbides, nickel, copper, silver, gold, zinc, iron, or a combination thereof.

Figure 6C:
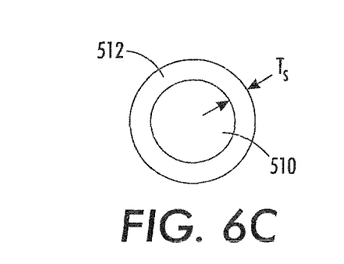
FIG. 6C depicts an exemplary carbon nanotube surrounded by a soft layer in accordance with various embodiments of the present teachings.

In embodiments, the CNTs 510 depicted in FIGS. 5A-5B and 6A-6B can further include an elastomeric material 512 attached with each CNT 510. In embodiments, as depicted in FIG. 6C, the elastomeric material 512 can be a shell layer surrounding a hard core of CNT 510.

The elastomeric material 512 can include, e.g., natural rubbers, synthetic rubbers, or their combinations. Exemplary synthetic rubbers can include, but are not limited to, polyolefin that includes one or more monomeric repeat units of olefin having from 1 to about 12 carbons, polybutadiene, fluoroelastomer, perfluoroelastomer, silicone, fluorosilicone, polysulfide, polyphosphazene, and mixtures thereof. In various embodiments, the elastomeric material 512 can be at least partially cross-linked such as vulcanized.

The elastomeric material 512 can have a shell thickness $T_s$ on the outer surface of the CNT hard core. The shell thickness $T_s$ can be at least about 1 nm, for example, in a range from about 1 nm to about 5 μm, or from about 1 nm to about 1000 nm. In various embodiments, the elastomeric material 512 can be attached to the CNT 510 by physical or chemical bonds through, for example, a functional group of the elastomers that is capable of bonding with the carbon nanotubes. In an exemplary embodiment, the elastomeric material 512 can have a chemically functional group capable of reacting with CNTs or modified CNTs by a covalent bond. The functional group can include, but is not limited to, hydroxyl, carboxylic acid, aziridine, azomethine ylide, aryl diazonium cation, oxazolidinone, and a mixture thereof.

The coated outermost layer 430 can include, e.g., CNTs ranging from about 0.1% to about 20%, or from about 0.5% to about 15%, or from about 1% to about 10% by weight of the total outermost layer.

In embodiments, the coated outermost layer shown in FIGS. 4A-4B, 5A-5B, and 6A-6B can provide desired mechanical, electrical, and/or thermal properties to facilitate use in electrophotographic printing devices and processes. For example, the outermost layer can have a tensile strength of at least about 3,000 psi, or ranging from about 3,000 psi to about 10,000 psi, or from about 4,000 to about 8,000, or from about 5,000 to about 7,000; an ultimate elongation of at least about 100%, or ranging from about 100% to about 500%, or from about 200% to about 400° A), from about 250% to about 350° A); a toughness of at least about 3,000 in.-lbs./in.³, or ranging from about 3,000 in.-lbs./in.³ to about 10,000 in.-lbs./ in.³, or ranging from about 4,000 in.-lbs./in.³ to about 9,000 or ranging from about 5,000 in.-lbs./in.³ to about 8,000 in.-lbs./in.³.

Figure 7:
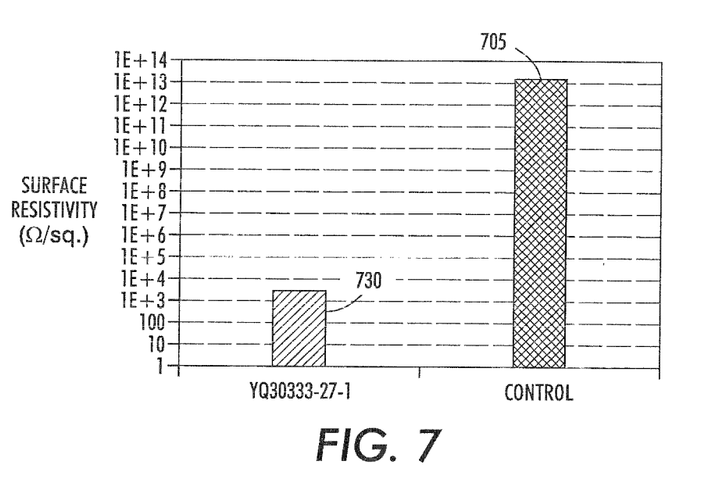
FIG. 7 depicts a surface resistivity result of an exemplary belt member in accordance with various embodiments of the present teachings.

FIG. 7 shows a surface resistivity result of an exemplary CNT/PFA coated outermost layer in accordance with various embodiments of the present teachings. For example, the CNT/PFA coating can be formed on a silicon wafer and can have about 2 wt % CNT-loading in the PFA matrix. FIG. 7 shows that the surface resistivity of the coated outermost layer can be decreased dramatically (see curve 730) as compared with the control sample that only contains PFA but without CNTs (see curve 705). That is, the surface conductivity of the coated CNT/PFA layer can be dramatically increased due to the addition of CNTs.

In embodiments, the outermost layer 430 in FIGS. 4-6 can be used for a fuser member and/or a pressure member in a fusing apparatus. For example, belt members shown in FIGS. 4A-4B can be used as a fuser belt and/or a pressure belt for fusing toner images on a print medium such as a copy sheet.

Figure 8:
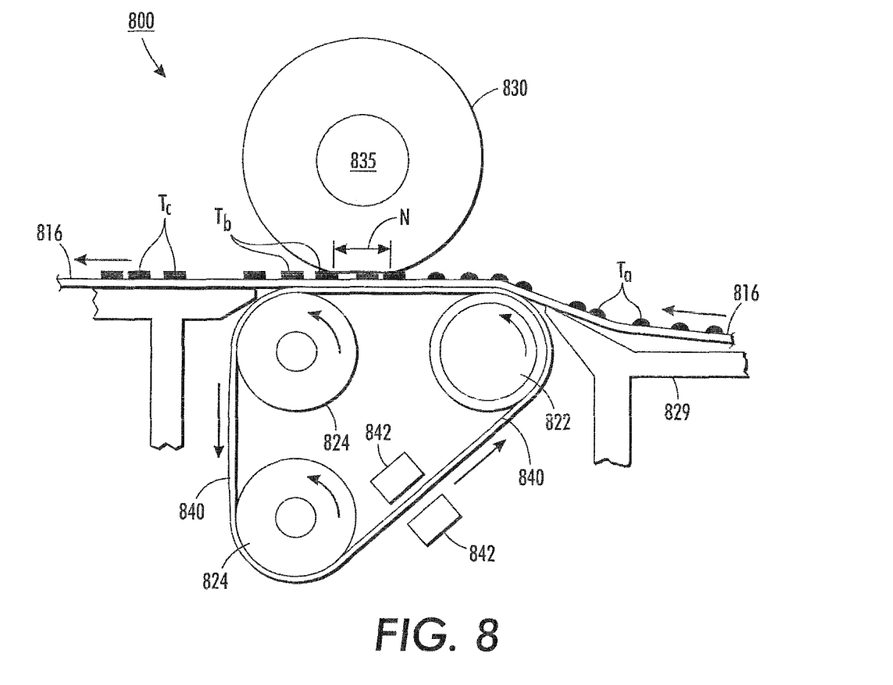
FIG. 8 depicts a sectional view of an exemplary fusing apparatus using a belt member in accordance with various embodiments of the present teachings.

FIG. 8 depicts a sectional view of an exemplary fusing apparatus 800 having a pressure belt in accordance with various embodiments of the present teachings. As shown, the fusing apparatus 800 can include a fuser member 830 and a pressure belt 840 (e.g., the belt member 400 A-B) configured to form a contact nip N there-between for a print medium 816 to pass through. Toner or other marking materials on the print medium 816 can then be fused on the print medium after passing through the contact nip N.

The fuser member 830 can be a heated fuser member including an internal heater 835 positioned inside the fuser member. Optionally, the heating member 835 can be positioned on the outside of the fusing member. In embodiments, the fuser member 830 can be a fuser roll as illustrated in FIG. 8 or a fuser belt (not illustrated). In embodiments, the outermost layer 430 (see FIGS. 4-6) can be an outermost layer of the fuser member 830 and/or the pressure belt 840.

The pressure belt 840 can be trained or contained around three parallel members including a driving roller 822 and follower rollers 824, e.g., formed of metal. The follower rollers 824 can also function as a tension roller for the pressure belt 840. A belt position sensor 842 in the form of a photocoupler can be disposed adjacent to a lateral end of the belt member 840 to facilitate the maintenance of the belt position within a predetermined lateral range. The pressure belt 840 can rotate at a predetermined peripheral speed in a direction by the rotation of the driving roller 822. The pressure belt 840 can be press-contacted to the fuser member 830 to form the contact nip N.

Figure 9:
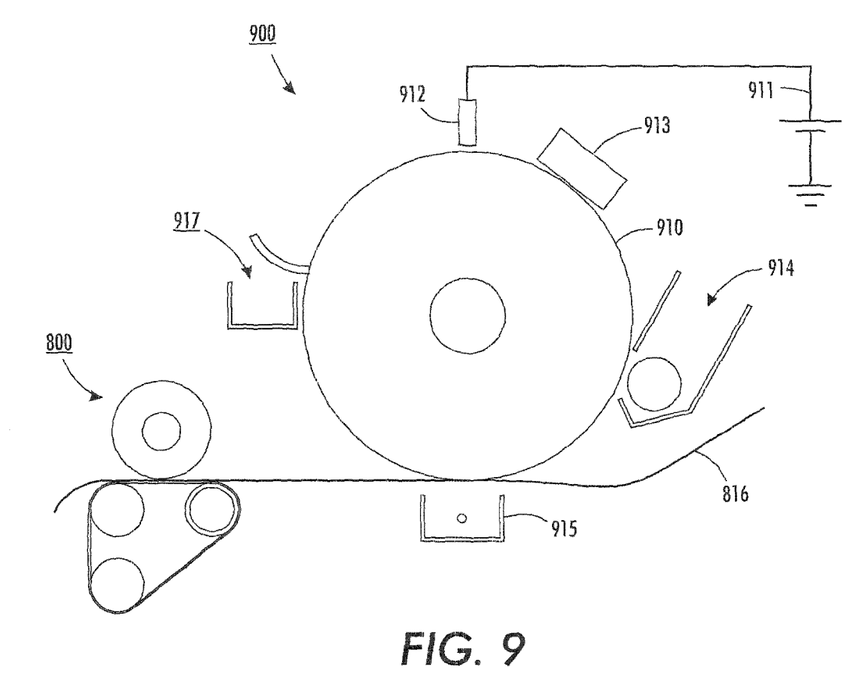
FIG. 9 depicts a sectional view of an exemplary electrophotographic reproducing apparatus in accordance with various embodiments of the present teachings.

In operation, upon an image formation start signal, an unfixed toner image can be formed on a recording material at an image forming station (see FIG. 9). The print medium 816 having the unfixed toner image Ta there-on can be guided by a guide 829 to enter between the fuser member 830 and the pressure belt 840 at the contact nip N, with the toner image carrying surface contacting the fuser member 830 moving at the same speed as the print medium 816.

FIG. 9 depicts an electro photographic reproducing apparatus 900 having the exemplary fusing apparatus 800 in accordance with various embodiments of the present teachings. For example, a photoreceptor 910 can be charged on its surface by means of a charger 912 to which a voltage can be supplied from a power supply 911. The photoreceptor can then be image-wisely exposed to light from an optical system or an image input apparatus 913, such as a laser and light emitting diode, to form an electrostatic latent image thereon. Generally, the electrostatic latent image can be developed by bringing a developer mixture from developer station 914 into contact therewith. Development can be effected by use of a magnetic brush, powder cloud, or other known development process. A dry developer mixture can usually include carrier granules having toner particles adhering triboelectrically thereto. Toner particles can be attracted from the carrier granules to the latent image forming a toner powder image thereon. Alternatively, a liquid developer material can be employed, which includes a liquid carrier having toner particles dispersed therein. The liquid developer material can be advanced into contact with the electrostatic latent image and the toner particles can be deposited thereon in image configuration.

After the toner particles have been deposited on the photoconductive surface in image configuration, they can be transferred to the print medium 816 by a transfer component 915 including, for example, a pressure transfer. Alternatively, the developed image can be transferred to an intermediate transfer member (not shown) and subsequently transferred to the print medium.

After the transfer of the developed image is completed, the print medium 816 can advance to a fusing station 800, for example, including a fusing roll and a pressure belt, wherein the developed image is fused to the print medium 816 by passing the print medium between the fusing roll and pressure belt, thereby forming a permanent image. On the other hand, the photoreceptor 910, subsequent to transfer, can advance to a cleaning station 917, wherein any toner left on photoreceptor 910 can be cleaned therefrom by use of a blade (as shown in FIG. 9), brush, or other cleaning apparatus.

EXAMPLES

Example 1

In this example, a material composite was prepared to have about 3 wt. % (weight percent) CNTs surrounded by VITON® elastomer, which was cured with 2 pph VC50. Specifically, about 12 parts of multi-walled carbon nanotubes and about 88 parts of VITON® GF (available from E. I. du Pont de Nemours, Inc., Wilmington, Del.) as a shell elastomer were placed in a Haake Rheomix mixer (Thermo Scientific, Waltham, Mass.), and compounded at a rotor speed of about 20 rpm for about 30 minutes to form nanotube master batch containing about 12 weight % of multi-walled carbon nanotubes dispersed in VITON® GF. About 20 parts of the resulted carbon nanotube master batch were then compounded with about 60 grams of a fluoro-plastic of THVP221 from Dyneon (Oakdale, Minn.) at about 80° C. in the Haake Rheomix at a rotor speed of about 20 rpm for about 30 minutes to form a polymer blend containing about 3 weight percent of carbon nanotubes covered by the VITON® elastomer shell.

The THVP/CNT/VITON® blend (about 4.18 Parts) was mixed with the metal oxides (about 0.348 part of magnesium oxide and about 0.174 part of calcium hydroxide), and about 0.84 parts of the bisphenol VC-50 curing agent (VITON® Curative No. 50 available from E. I. du Pont de Nemours, Inc.) in methyl isobutyl ketone (28.4 parts). The resulted coating composition was then cast in a mold. The resulting film after solvent evaporation was cured at ramp temperatures such as about 149° C. for 2 hours, about 177° C. for 2 hours, about 204° C. for 2 hours, and at about 232° C. for 6 hours for a post cure.

Example 2

About 3 wt. % carbon nanotubes surrounded by a VITON® elastomer was prepared following the procedure described in Example 1. The THVP/CNT/Client VITON® composite blend (about 4.225 Parts) was mixed with the metal oxides (about 0.348 part of magnesium oxide and about 0.174 part of calcium hydroxide), and about 2.1 parts of the bisphenol VC-50 curing agent (VITON® Curative No. 50 available from E. I. du Pont de Nemours, Inc.) in methyl isobutyl ketone (about 28.5 parts) to form a coating composition, which was then cast in a mold. The resulting film after solvent evaporation was cured at ramp temperatures such as about 149° C. for 2 hours, about 177° C. for 2 hours, about 204° C. for 2 hours, and at about 232° C. for 6 hours for a post cure.

Each cured composite film of Examples 1-2 was cut into 5 specimens that were then subjected to a mechanical test and averaged for each example of Examples 1-2. The mechanical test was performed using ASTM D412 Tensile Properties of Elastomers (Thomson Scientific, Chicago, Ill.). The results were summarized in Table 1 as following.

TABLE 1

| Sample | Tensile stress (psi) | Tensile strain (%) | modulus (psi) | Toughness (lbf · in/in$^3$) |
|---|---|---|---|---|
| Example 1 | 3,041.9 | 507.4 | 755.6 | 7695.8 |
| Example 2 | 2,706.5 | 385.8 | 1,768.1 | 5244.0 |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising."

Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A pressure member comprising:
a substrate, and
an outermost layer disposed over the substrate, wherein the outermost layer comprises a plurality of carbon nanotubes (CNTs), each CNT surrounded by a shell comprising an elastomeric material, the elastomeric material being dispersed within a fluoroplastic material for providing the outermost layer a tensile strength of at least about 3000 psi, wherein the elastomeric material is at least partially crosslinked to form the shell independent of the fluoroplastic material, and
wherein the elastomeric material is selected from a group consisting of a fluoroelastomer, a perfluoroelastomer, a silicone, a fluorosilicone, a polysulfide, a polyphosphazene and a mixture thereof, and
wherein the fluoroplastic material is different from the elastomeric material, the fluoroplastic material comprising a repeating unit corresponding to a monomer that is selected from a group consisting of tetrafluoroethylene (TFE), hexafluoropropylene (HFP), perfluoropropyl vinyl ether (PPVE), perfluoroethyl vinyl ether (PEVE), perfluoromethyl vinyl ether (PMVE), chlorotrifluoroethylene (CTFE), vinyl fluoride (VF), and vinylidene fluoride (VDF), and a combination thereof.

2. The member of claim 1, wherein the outermost layer has an ultimate elongation of at least about 100% and a toughness of at least about 3,000 in.-lbs./in.$^3$.

3. The member of claim 1, further comprising a shell thickness ranging from about 1 nanometer to about 5 micrometers.

4. The member of claim 1, wherein each CNT has an inside diameter ranging from about 0.5 nanometers to about 20 nanometers, an outside diameter ranging from about 1 nanometer to about 80 nanometers, and an aspect ratio ranging from about 1 to about 10000.

5. The member of claim 1, wherein the plurality of CNTs is present in an amount ranging from about 0.1 percent to about 20 percent by weight of the total outermost layer.

6. The member of claim 1, wherein the elastomeric material further comprises a functional group capable of bonding with the plurality of CNTs, wherein the functional group is selected from the group consisting of a hydroxyl, a carboxylic acid, an aziridine, an azomethine ylide, an aryl diazonium cation, an oxazolidinone, and a mixture thereof.

7. The member of claim 1, wherein the fluoroplastic is selected from the group consisting of polyfluoroalkoxypolytetrafluoroethylene (PFA), polytetrafluoroethylene (PTFE), fluorinated ethylenepropylene copolymer (FEP), and a combination thereof.

8. The member of claim 1, wherein the outermost layer of the pressure member further comprises one or more filler particles dispersed within the outermost layer, the filler particles comprising metal oxides, silicon carbide, boron nitride, and graphite, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and a mixture thereof.

9. The member of claim 1, wherein the outermost layer of the pressure member has a thickness ranging from about 5 microns to about 250 microns.

10. The member of claim 1, wherein the substrate comprises a polyimide selected from the group consisting of aromatic polyimide, polyamideimide, polyetherimide, siloxane polyetherimide block copolymer, and a mixture thereof.

11. The member of claim 1, wherein a functional layer is disposed between the substrate and the outermost layer, wherein the functional layer comprises a conformal layer, an adhesive layer, or a combination thereof.

12. The member of claim 1, wherein the elastomeric material is a fluoroelastomer, the fluoroelastomer being a crosslinked tetrapolymer of TFE, vinylidene fluoride (VF2) and HFP.

13. A fusing apparatus comprising:
a fuser member; and
a pressure member configured to form a contact nip with the fuser member to fuse toner images on a print medium that passes through the contact nip, wherein the pressure member comprises:
  a substrate, and
  an outermost layer disposed over the substrate, wherein the outermost layer comprises a plurality of carbon nanotubes (CNTs) with each CNT surrounded by a shell comprising an elastomeric material and uniformly distributed in a fluoroplastic material to provide the outermost layer a toughness of at least about 3,000 in.-lbs./in.$^3$, the elastomeric material being selected from a group consisting of a fluoroelastomer, a perfluoroelastomer, a silicone, a fluorosilicone, a polysulfide, a polyphosphazene and a mixture thereof, wherein the elastomeric material is at least partially crosslinked to form the shell independent of the fluoroplastic material, and
  wherein the fluoroplastic material is different from the elastomeric material, the fluoroplastic material is selected from the group consisting of polyfluoroalkoxypolytetrafluoroethylene (PFA), polytetrafluoroethylene (PTFE), fluorinated ethylenepropylene copolymer (FEP), and a combination thereof.

14. The apparatus of claim 13, wherein the outermost layer has a tensile strength of at least about 2000 psi and an ultimate elongation of at least about 100%.

15. The apparatus of claim 13, wherein the elastomeric material is a fluoroelastomer, the fluoroelastomer being a cross-linked tetrapolymer of TFE, VF2 and HFP.

16. An image forming apparatus comprising:
a photoreceptor for receiving an electrostatic latent image thereon;
a development component for applying toner to the photoreceptor to develop the electrostatic latent image, thereby forming a developed image on the photoreceptor;
a transfer component to transfer the developed image from the photoreceptor to a print medium; and
a fusing apparatus comprising a fuser member and a pressure member configured for forming a contact nip between the fuser member and the pressure member for fusing toner images on the print medium passing through the contact nip, wherein the pressure member comprises,
  an outermost layer comprises a plurality of carbon nanotubes (CNTs) with each CNT surrounded by a shell comprising an elastomeric material and uniformly distributed in a fluoroplastic material to provide the outermost layer a tensile strength of at least about 3000 psi, an ultimate elongation of at least about 100%, and a toughness of at least about 3,000 in.-lbs./in.$^3$, the elastomeric material being selected from a group consisting of a fluoroelastomer, a perfluoroelastomer, a silicone, a fluorosilicone, a polysulfide, a polyphosphazene and a mixture thereof, wherein the elastomeric material is at least partially crosslinked to form the shell independent of the fluoroplastic material, and
  wherein the fluoroplastic material is different from the elastomeric material, the fluoroplastic material comprising a repeating unit corresponding to a monomer that is selected from a group consisting of tetrafluoroethylene (TFE), hexafluoropropylene (HFP), perfluoropropyl vinyl ether (PPVE), perfluoroethyl vinyl ether (PEVE), perfluoromethyl vinyl ether (PMVE), chlorotrifluoroethylene (CTFE), vinyl fluoride (VF), and vinylidene fluoride (VDF), and a combination thereof.

17. The apparatus of claim 16, wherein the shell thickness is from about 1 nanometer to about 5 micrometers.

18. The apparatus of claim 16, wherein the plurality of CNTs is present in an amount ranging from about 0.1 percent to about 20 percent by weight of the total outermost layer.

19. The apparatus of claim 16, wherein the elastomeric material is a fluoroelastomer, the fluoroelastomer being a cross-linked tetrapolymer of TFE, VF2 and HFP.

* * * * *